United States Patent [19]

Copland

[11] Patent Number: 5,964,471
[45] Date of Patent: Oct. 12, 1999

[54] STEERABLE TROLLEY

[76] Inventor: Alaister Copland, 31 Collwood Close, Poole, Dorset BH15 3HG, United Kingdom

[21] Appl. No.: 08/930,468
[22] PCT Filed: Mar. 22, 1996
[86] PCT No.: PCT/GB96/00687
 § 371 Date: Nov. 13, 1997
 § 102(e) Date: Nov. 13, 1997
[87] PCT Pub. No.: WO96/29228
 PCT Pub. Date: Sep. 26, 1996

[30] Foreign Application Priority Data

Mar. 22, 1995 [GB] United Kingdom .................. 9505772
Jun. 6, 1995 [GB] United Kingdom .................. 9511422

[51] Int. Cl.⁶ .................................................. B62B 3/00
[52] U.S. Cl. .................................. 280/47.11; 280/33.991; 180/408; 180/409
[58] Field of Search ........................... 280/47.11, 33.991, 280/33.992, 98, 99; 180/408, 409, 411

[56] References Cited

U.S. PATENT DOCUMENTS

| | | | |
|---|---|---|---|
| 2,551,821 | 5/1951 | Bengtson | 74/243 |
| 2,834,605 | 5/1958 | McCollough | 180/410 |
| 3,235,283 | 2/1966 | Voghel | 180/409 |
| 4,248,444 | 2/1981 | Johnson | 280/47.11 |
| 4,852,679 | 8/1989 | Fry | 180/234 |
| 4,934,726 | 6/1990 | Daenens et al. | 280/408 |

FOREIGN PATENT DOCUMENTS

| | | |
|---|---|---|
| 3039947 | 6/1982 | Germany . |
| 9006629 | 9/1990 | Germany . |
| 560112 | 3/1944 | United Kingdom . |
| 9105672 | 5/1991 | WIPO . |

Primary Examiner—J. J. Swann
Assistant Examiner—James S. McClellan
Attorney, Agent, or Firm—Edwin D. Schindler

[57] ABSTRACT

A steerable trolley, typically a shopping trolley, comprises two or more pivotable wheels and the steering mechanism comprising communication elements between a driving wheel and corresponding driven wheel, the communication elements being operable such that pivotal movement of the driving wheel about a substantially vertical axis acts to produce a pivotal movement of the corresponding driven wheel, wherein when the driving wheel is a rear wheel the driven wheel is a front wheel and vice versa. Advantageously only one and preferably, the outer of the driving wheels acts to produce the pivotal movement of its corresponding driven wheel during cornering of the trolley. An override mechanism for user engagement or disengagement when the trolley is stacked is also provided. An arcuate handle bar and side bars may also be provided. Ease of maneuverability is assisted by differential offsets in the drive and driven wheels.

23 Claims, 13 Drawing Sheets

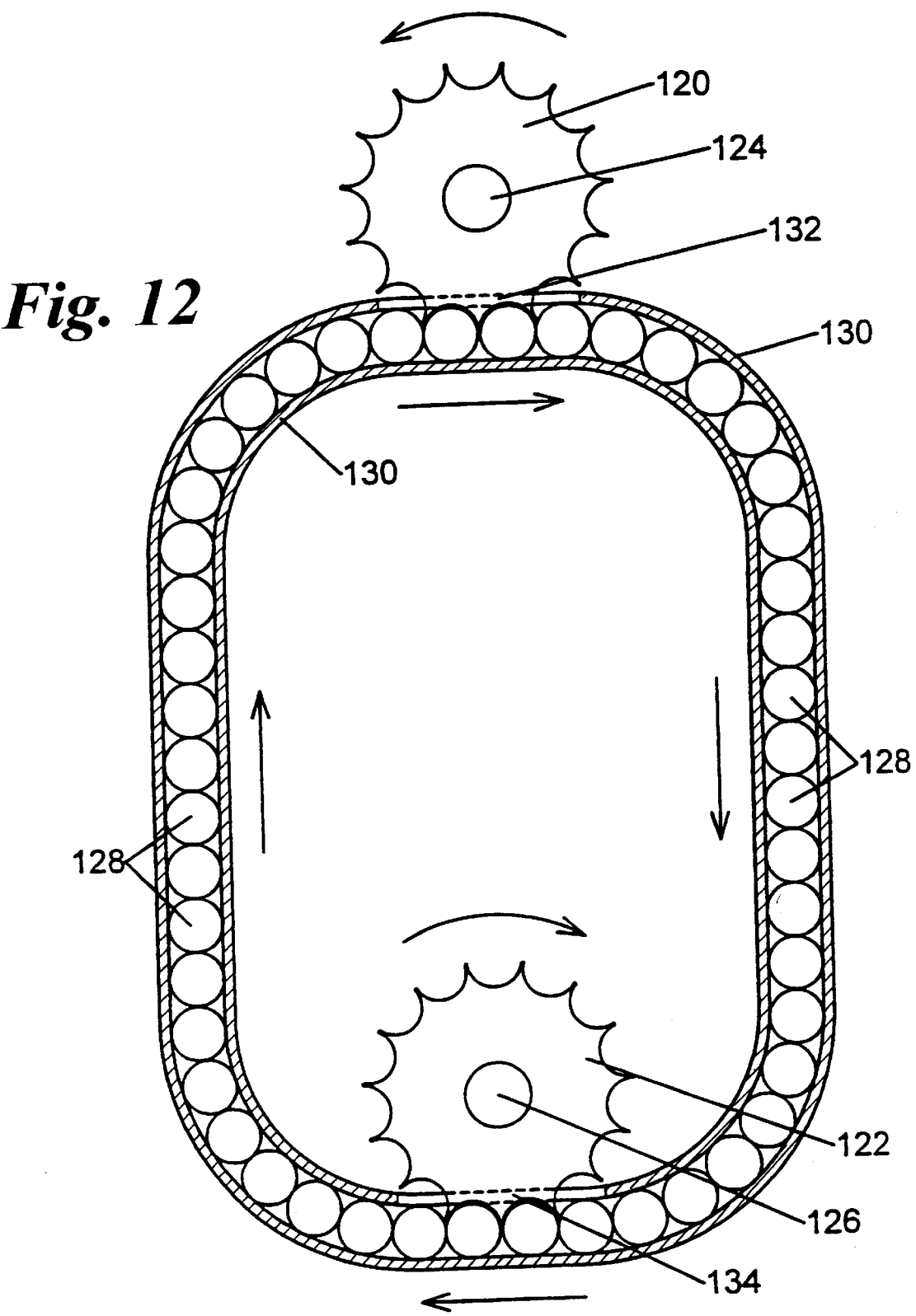

STEERABLE TROLLEY

BACKGROUND OF THE INVENTION

This invention relates to a steerable trolley, and more particularly but not exclusively to a castor wheeled trolley such as a supermarket trolley.

SUMMARY OF INVENTION

Supermarket trolleys are a well known article and commonly comprise a manually propelled trolley comprising some form of load holder which may be secured to a frame which is mounted on four independent castor wheels. The trolley usually has a handle bar which extends laterally adjacent to the upper part of the rear side of the load holder between two parallel arms which project rearwardly from the load holder with which the operator controls the trolley. The castor wheels allow the trolley to be moved in any direction at any time. However, the castor wheels suffer a number of disadvantages. For instance, the trolley easily runs wide and out of control when any attempt is made by the user to change the trolley's direction of travel. The operator can overcome this problem in one of two ways. Firstly, he may realign the trolley in the required direction of travel by making sideways movements in the opposite direction at his end of the trolley while the other end of the trolley remains relatively stationary. Progress by this method is very hesitant and considerable energy is expended through overcoming inertia when continually stopping and starting the trolley's movements. Alternatively, the operator may use his strength at his end of the trolley to apply a turning moment on the trolley. The other end of the trolley is pulled round in one direction while the operator's end is pushed out in the other direction and the trolley thus changes direction. Progress is much smoother by this method but it requires a good deal of strength especially with large and heavy trolleys and is considered to be responsible for back injury to the operator.

Further problems arise in the case of a trolley with a "sticking" wheel. Typically, when one wheel is reluctant to roll smoothly it acts as a brake on that wheel and the trolley is subjected to brake steering. The trolley is then dragged around to the side with the sticking wheel. The operator must then take action to overcome this problem. One possibility is to position the faulty wheel close to an imaginary line which passes through both the trolley's centre of gravity and the mid-point between the operator's two pushing hands. This causes what is commonly known as "crab-steering" and the trolley thus affected takes up more floor space than it would require normally. Alternatively, the operator may try to apply a turning moment to the trolley equal to that being applied by the faulty wheel through the braking effect. The trolley thus remains in line with the direction of travel, the floor space used remains normal but the strain on the operator is considerable.

A still further problem with this type of trolley is the tendency for the trolley, when crossing slopes, to be subjected to gravitational forces and to run downhill due to the tendency of the castor wheels to turn and follow the path of least resistance. To successfully cross a slope the operator must either create a barrier by positioning his body close to the imaginary line which passes through the trolley's centre of gravity and which points directly downhill or, again, apply a turning moment to the trolley equal to that being applied by gravity. Both methods cause inconvenience to the operator.

The yet further problem with this type of trolley is that when stopped on a slope the trolley is again subjected to gravitational forces and would run downhill unless the trolley operator provided a barrier, usually by positioning his body downhill from the trolley. This not only inconveniences the operator but makes loading or unloading the trolley very difficult indeed.

It is an object of the present invention to overcome these problems.

According to the present invention there is provided a steerable trolley comprising:

at least four wheels each pivotable about a respective substantially vertical axis;

a steering mechanism comprising communication means between a driving wheel and a corresponding driven wheel, the communication means being operable such that pivotal movement of the said driving wheel about a substantially vertical axis acts to produce a pivotal movement of the said corresponding driven wheel, such that when the driving wheel is a rear wheel of the said at least four wheels, the driven wheel is a front wheel of the said at least four wheels and vice versa;

means for automatically engaging the outside driven wheel and disengaging the inside driven wheel during cornering of the trolley, so that only the outside driving wheel acts to produce the said pivotal movement of its corresponding driven wheel respectively during cornering of the trolley.

Preferably, the means for engaging or disengaging the driven wheel is provided by a lug, connected to a rack, which engages with an abutment connected to the wheel in one direction of rotation of the rack and disengages in the other direction of rotation of the rack.

The means for engaging or disengaging the driven wheel may also comprise a spring loaded catch.

It is preferred that the trolley include means for locking the steering mechanism to prevent the disengagement which normally occurs at the inner wheels during cornering of the trolley. As mentioned above, during cornering of the trolley, the front and rear inner wheels may be disengaged so that cornering of the trolley is effected under guidance of the outer wheels. If cornering is taking place on a slope, it is possible that the outer wheels could become parallel so that the trolley would tend to move down the slope. The same effect is possible if the driving and/or the driven wheels encounter a surface depression. To assist with this problem provision may be made to lock the wheels into steering mode on both sides of the trolley so that control is shared by both inner and outer wheels.

Preferably, the trolley includes means for disengaging the steering mechanism to allow independent pivotal movement of the said wheels.

A preferred method of disengagement is effected by disengaging the front wheels from the corresponding racks. This has the effect that the pinion is still rotated by the rack of the rear wheel but no resultant affect is transferred to the front wheels.

A trolley according to the present invention comprises at least four pivotable wheels and two communication means between a first and second set of front and rear wheels.

The communication means may comprise a plurality of parts forming or formed into an endless line within the cavity of a close fitting loop, which loop extends between respective sprockets on the drive and driven wheels located at either end of the loop to transfer rotative movement from the drive wheel to the driven wheel by engagement of the teeth of the drive and driven sprockets with the parts during rotation of the drive wheel; and wherein sprocket access to the parts is provided by respective lateral slots formed in the part of the loop adjacent to each sprocket.

Typically, the loop is non-rigid and may be shaped to fit through, or to, the frame of the trolley. Such communication means between the drive and driven wheels avoids the necessity to have additional components appearing around the base of the trolley.

It is preferred that the parts are balls and each ball between respective sprockets abuts onto the next to effect movement of the line during driven wheel rotation. The balls may be spaced from each other and connected by a chain or like mechanism so that the line is pulled through the loop to effect driven wheel rotation.

The communication means may also comprise a substantially horizontal longitudinal bar extending between the front and rear wheel which translates pivotal movement of the driving wheel into pivotal movement of the driven wheel.

Preferably, the longitudinal bar is so associated with the rear wheel and front wheel as to respond to pivotal movement of the rear wheel by rotating about its own longitudinal axis which simultaneously effects pivotal movement of the front wheel and vice versa.

The longitudinal bar may have co-axial pinions disposed at either end thereof which engage with respective racks on each of the associated front and rear wheels which racks rotate, to effect rotation of the associated pinion, in response to the pivotal movement of the front or rear wheel.

In the preferred embodiment, the said pivotable movement of the said driving wheel is caused by a lateral movement of the trolley at the end of the trolley where the said driving wheel is located.

Preferably, the movement of the trolley is effected by the manual application of steering effort.

It is also preferred that the trolley wheels are capable of complete reversals of direction by independently completing 180° pivots.

Preferably, the outside rear wheel acts to produce the said pivotal movement of the outside front wheel during cornering of the trolley.

The trolley of the present invention is particularly suitable as a shopping trolley.

For ease of operation, it has been found that it is preferable for the pivotable movement of the driven wheel to be a substantially equal and opposite pivotal movement of the driving wheel. This allows smoother and more controlled cornering and prevents the trolley from running wide.

It is also preferred that the trolley include a handle bar which defines an arc whose centre equates with the centre of rotation of the trolley. Preferably, the handle bar is angled downwardly towards the rear of the trolley. The arcuate handle bar contributes significantly to the efficiency of the trolley. Both the curvature of the arc and the rearwardly downward angling thereof provide a more natural grip for the hands of the user. It also allows the user's hands and forearms to be placed in a more natural position for effecting the required steering action. The downward angling of the arc allows a smaller user to comfortably grip the arcuate handle bar towards the lower rear portion whereas a taller user can grip the arc towards the higher front sections of the handle bar. Clearly, such a configuration allows users more freedom of choice and comfort.

The handle bar provides further advantages. As the most rearward portion of the trolley is now lower due to the downward angling of the handle bar, it provides less of a barrier to the user when placing articles in the basket of the trolley from the rear. Furthermore, the increased gap between the handle and the trolley and the rounded shape of the handle bar is more accommodating of the female upper body form when she reaches into the basket from the rear.

The trolley may also include a side bar to allow maneuvering of the trolley from the side.

Preferably, the trolley includes two side bars and an arcuate handle bar incorporated into a single symmetrical bar.

Advantageously, the side -bars may be used to allow the user to grip the trolley from the side to effect either forward or rearward manoeuvring or turning of the trolley. This is particularly useful with this type of trolley where the castors are not capable of independent action, without first activating the disengaging mechanism, and thus maneuvering from the side can be easily and reliably effected.

A further preferred feature of the present invention is the provision of differing offsets on the front and rear trolley wheels. Typical castor wheels pivot about a vertical spindle which generally extends upwardly more or less at a tangent to the circumference of the wheel. The axis of the wheel or castor is thus displaced or "offset" from the axis of the spindle. Typically, the trolley of the present invention includes drive wheels with a larger offset than the driven wheels. The advantage of the larger offset is to give greater leverage in the drive wheels so as to ease maneuvering of the driven wheels. Preferably, the differential between the drive and driven wheel offsets is 50%.

However, in some cases, it is beneficial for the driving wheels to be fitted with less offset than the driven wheels. Such an arrangement reduces the 'oversteer' that can be experienced in shorter trolleys. Generally, the offset may be varied and optimised to suit particular trolley requirements.

The present invention also extends to a trolley substantially as described herein with reference to FIGS. 1–13 of the accompanying drawings.

BRIEF DESCRIPTION OF THE DRAWINGS

The invention will now be described, by way of example, with reference to the accompanying drawings in which:

FIG. 11(*b*) is a plan view of a handle bar.

FIG. 12 is a schematic view of an alternative communication means.

DETAILED DESCRIPTION OF THE INVENTION

Figure 1:
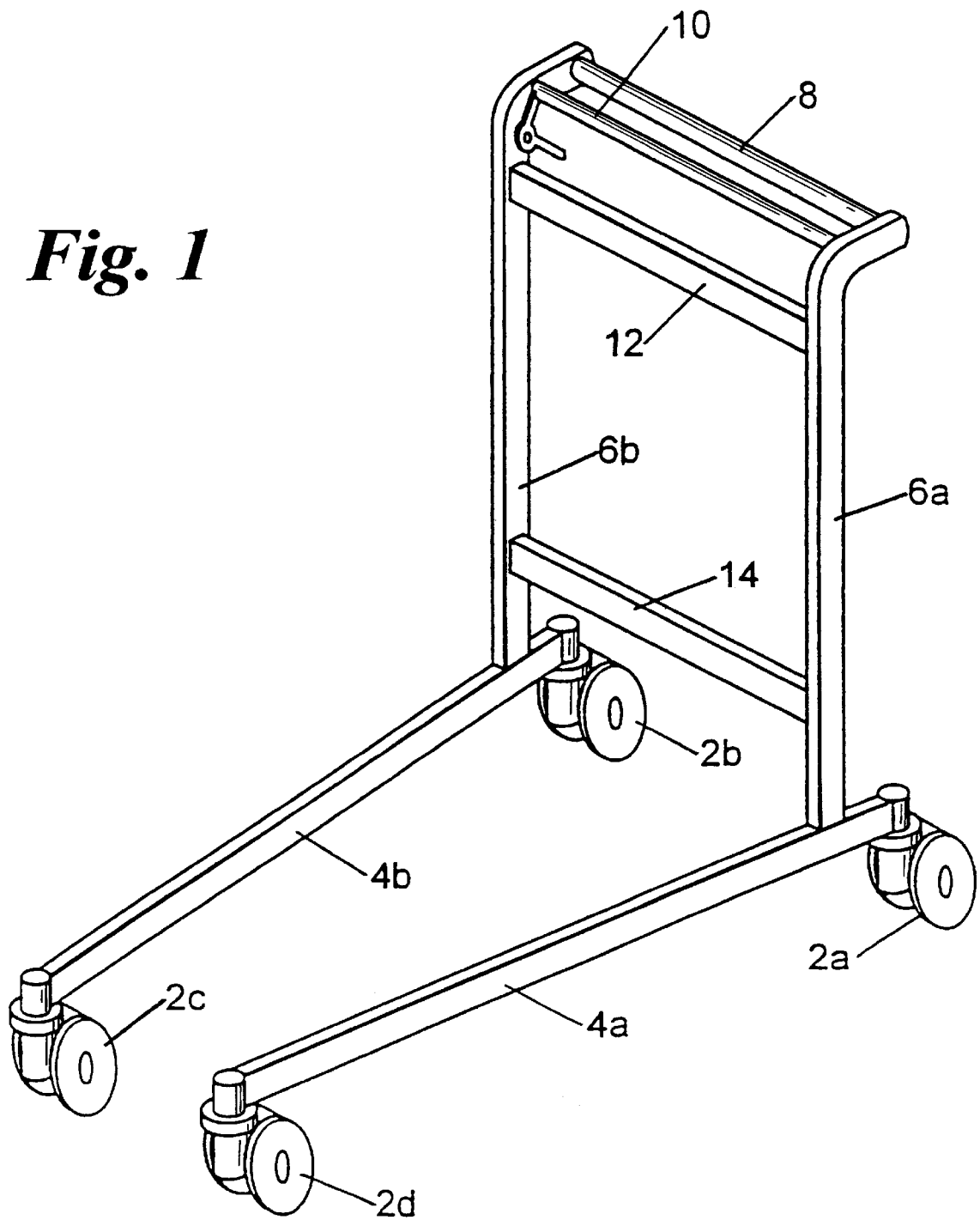
FIG. 1 is a perspective view of a typical arrangement of a steerable trolley.
Figure 2:
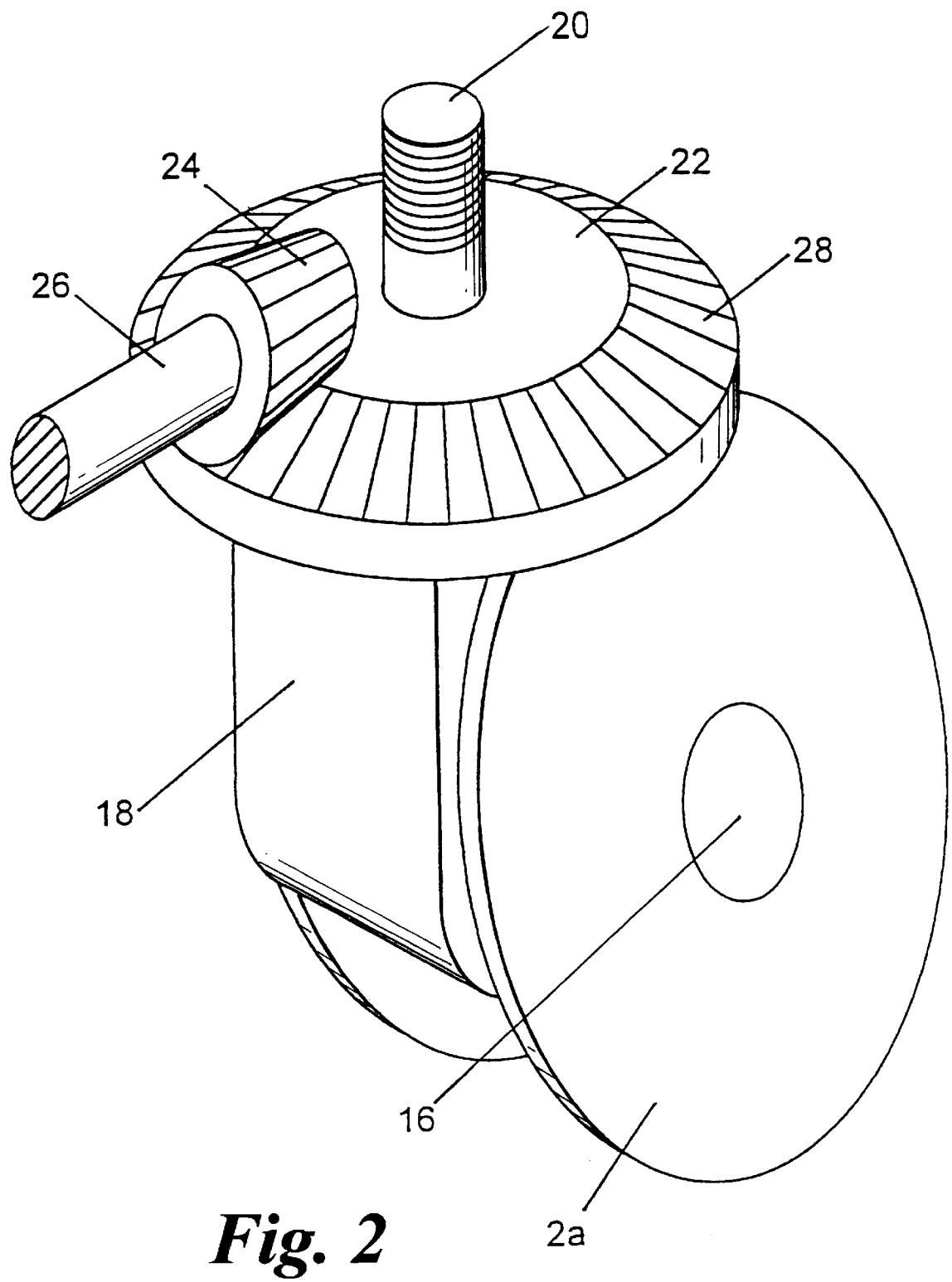
FIG. 2 is a detailed perspective view of a rear castor.
Figure 3:
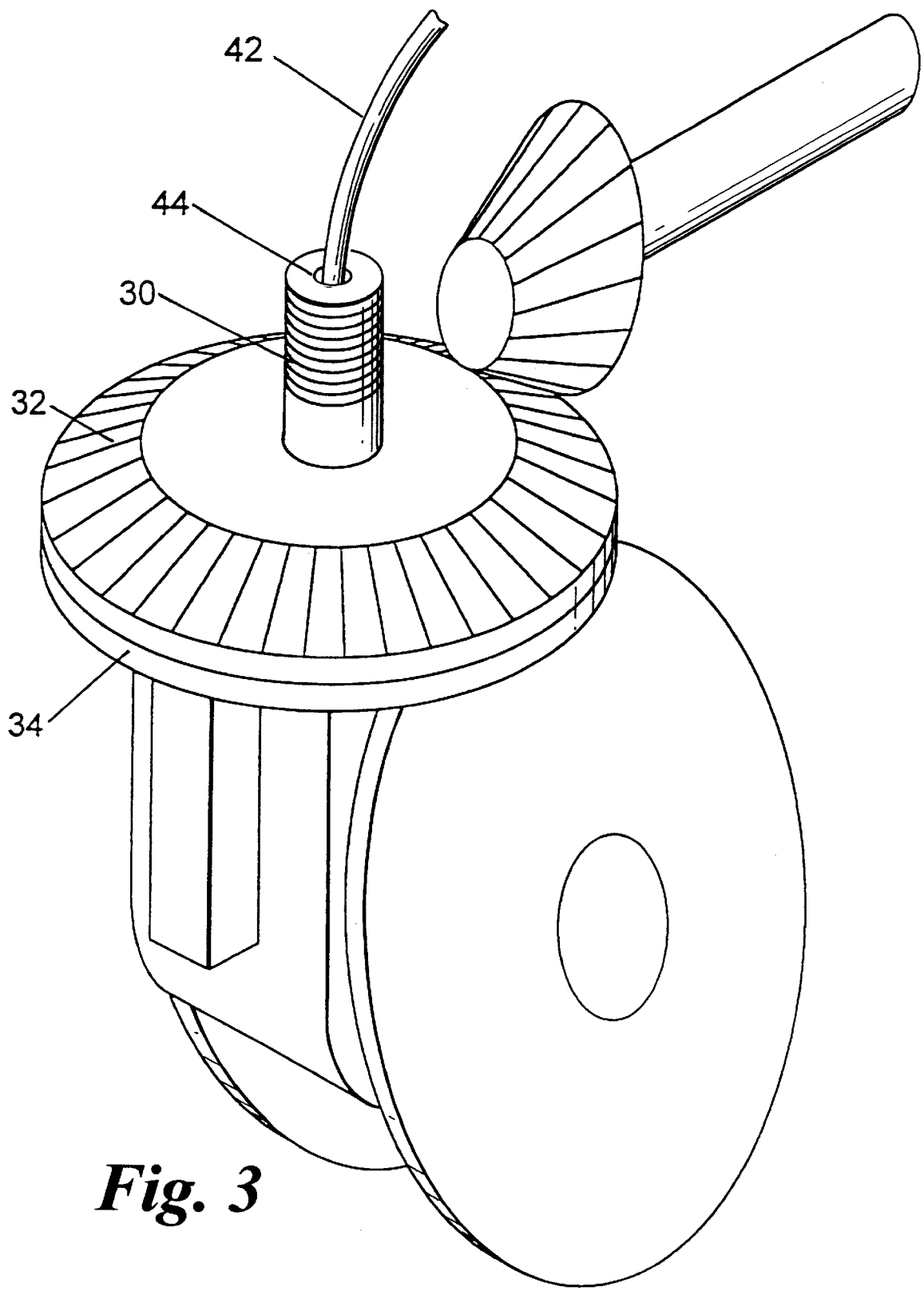
FIG. 3 is a detailed perspective view of a front castor.

Referring to FIG. 1, a steerable trolley comprising four swivel castors 2 (a–d) which depend from two elongate forwardly converging side members 4a and 4b at either end thereof. Two upright spaced members 6a and 6b extend substantially vertically, one from each of the side members 4a and 4b adjacent to the respective rear ends thereof. The upright spaced members are angled rearwardly at the upper end thereof and a handle bar 8 extends laterally between the two inside faces of the rearwardly extending portion of the upright members 6a and 6b and each end of the handle bar 8 is secured thereat so as to permit manoeuvring of the trolley by means of the said handle. A disengaging bar 10, co-extensive with the said handle bar 8 and spaced forwardly thereof is effective to permit the user to disengage the steering mechanism (not shown) from the front wheels 2c and 2d of the trolley. Two support bars, 12 and 14, extend between and are secured to the upright portions of the upright members 6a and 6b in spaced parallel relationship to provide a sturdy frame for the trolley. Referring to FIG. 2, a castor wheel 2a rotates about a centrally disposed axle, 16, which is journalled in the castor body, 18. Mounting Stud 20 extends vertically upwards from the top side of the castor body (not shown) to be pivotally mounted, in use, in a close fitting socket on the underside of the side member 4a. A crown gear, 22, is rigidly mounted to the top of the castor body 18 co-axial with the mounting stud 20 such that rotation of the castor wheel effects a corresponding rotation of the crown gear 22 which thereby engages with a pinion gear 24 rigidly fixed in a co-axial manner to the end of a shaft 26 which extends from the Pinion 24 to a second pinion (not shown) which interacts with the front wheel. The total of the crown gears are formed on a frusto-conical surface 28 around the periphery of the circular crown gear and the pinion 24 is formed into a corresponding frusto-conical body for close fitting engagement therewith. In use, the shaft and pinions are secured to the mounting stud 20 and the corresponding mounting stud 30 on the front wheel so that the position of the shaft with respect to the vertical wheel axes remains constant. In this arrangement, engagement of the crown gear with the pinion gear causes rotatory movement of the shaft about its own axis and thus translates rotatory movement of the driving rear wheel into rotatory movement of the driven front wheel. Referring to FIG. 3, the front castor is as the rear castor previously described with some additional features. The Crown Gear on the front wheel is split into an upper gear plate and a lower equi-axial, equi-radial fixed plate 32 and 34. A spring loaded catch, 36 is operable to pass through a hole, 38, in the lower fixed plate, 34, and engages with a socket, 40, formed in the lower side of the upper plate, 32, so that the two plates may rotate together when the catch extends into the said socket but move independently of each other when the catch is retracted from the said socket. A cable 42 passes through a central longitudinally extending hollow shaft 44 formed in the mounting stud 30 to connect with a lever 48 which pivots about a fixed point, 46. The distal end of the lever 48, with respect to the lever cable end 45, has a rod 50 which extends vertically therefrom to be connected to the lower end of the catch 36. The end of the lever arm 48 is located below the spring housing 54 so that the elongate rod 50 extends through an aperture in the base of the housing to pass through the helical cavity of the coil spring 52 before connecting with the catch 36. The spring 52 is supported by the inner upper face of the bottom of the housing and extends vertically therefrom in a helical manner around the rod 50 to support the base of the catch at its upper end. Reaction of the cable causes the lever 48 to pivot about pivot point 46 and thus effect downward vertical movement of the catch 36 by way of the rod 50 attached to the other end of the lever 48. Such a movement disengages the upper and lower crown gear plates and allows the wheel to move independently. The cable passes up through the trolley to be fixed at its other end to the disengaging handle 56 which is connected by an arm 58 to the rotatable fixed bar 10. The disengaging handle 56 must pivot about the fixed bar 10 and may be moved towards the operator handle 8 which is adjacent thereto about said pivot to effect retraction of the catch 36 and disengagement of the front wheel mechanism. A second arm 100 extends downwardly from the fixed bar 10 and adjacent to the inside face of the rearwardly directed arm 102 of the upright member 6a to protrude below the said arm 102. A transverse actuating bar 104 extends outwardly from the lower end of and at right angles to the arm 100 to pass underneath the lower side of the upright member arm 102. The trolley is designed to be stacked with other similar trolleys for storage and transportation purposes by having a rear side of the load basket forwardly pivotable about hinges adjacent the upper periphery of the basket(not shown), which permits the basket of a second trolley to be stacked within the basket of the first trolley by pushing the front of the basket of a second trolley into engagement with the said rear side to cause the latter to pivot about the hinges and permit the second trolley to pass within the load basket. The bar 104 is thus actuated by coming into abutting engagement with the upper peripheral rim of a second trolley when the latter is stacked into the trolley associated with the said bar.

Figure 4:
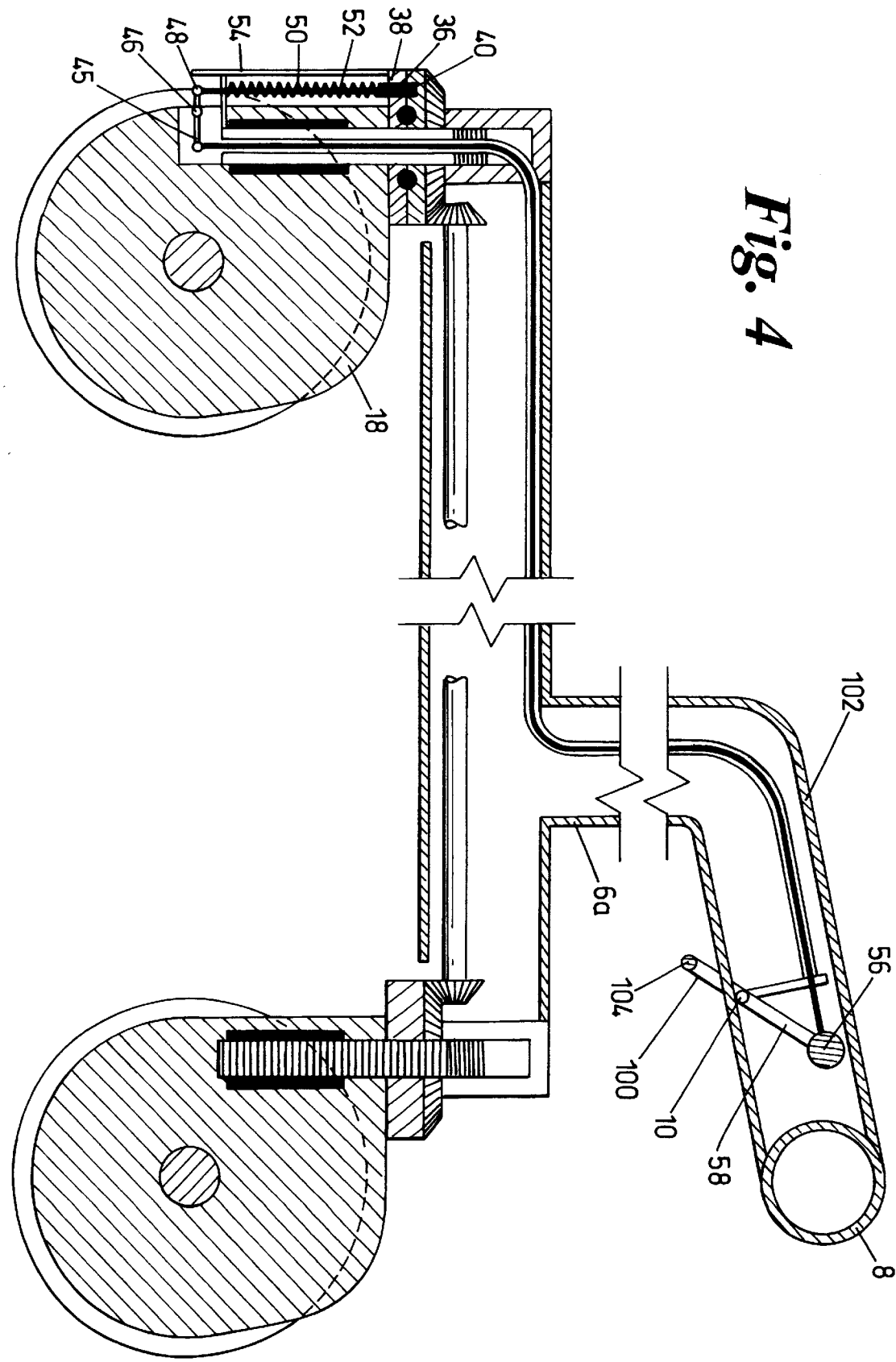
FIG. 4 is a schematic sectional view through one side of the trolley frame.

In the embodiment shown in FIG. 4 only one cable is displayed but there are two such cables connected to each of the front wheels each having a corresponding catch arrangement. In the arrangement shown, the lower plate 34 is fixedly mounted on the castor body 18 and the upper crown gear plate 32 is rotatable about its central axis.

Figure 5:
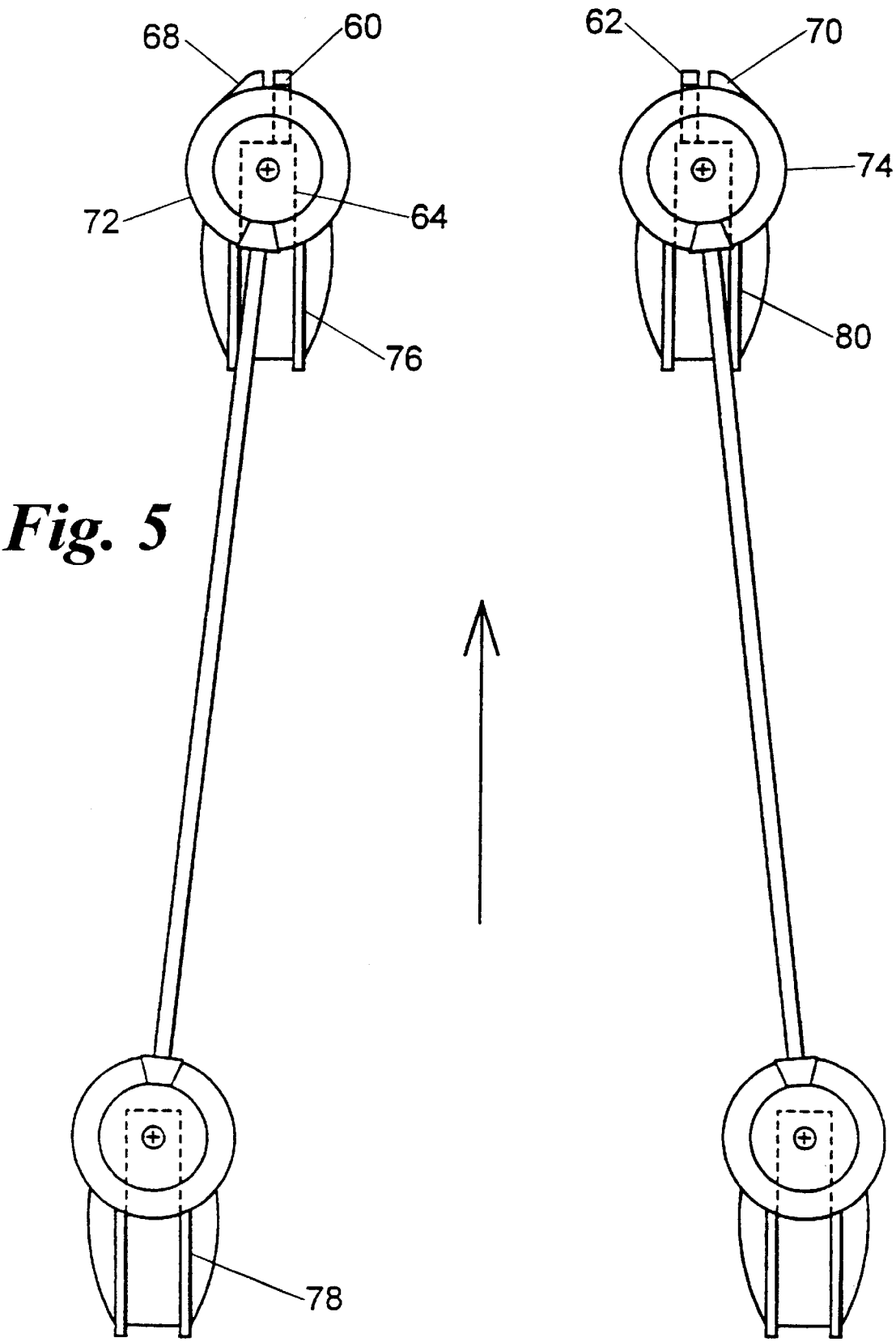
FIG. 5 is a schematic plan view of four castors travelling in a forward direction.
Figure 6:
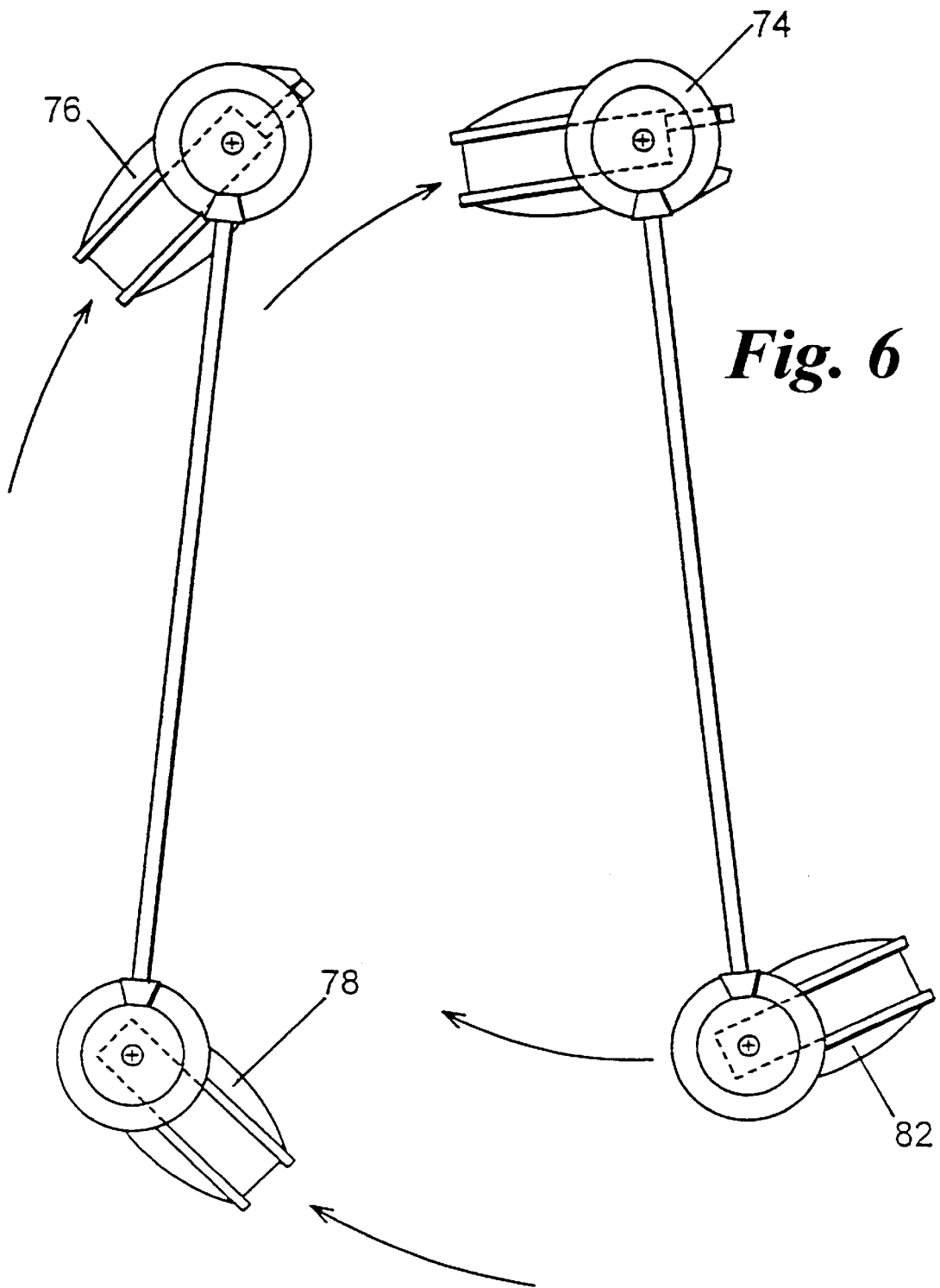
FIG. 6 is a schematic plan view of four castors during a right-hand turn.

Referring to FIG. 5, the arrangement of the castor wheels on a forward travelling trolley shows a different spring loaded catch arrangement. In this arrangement, the catch takes the form of a lug 60, 62 which is securely fixed to the castor body 64 66 respectively. Abutments 68, 70 are fixedly secured to the crown gear 72, 74 respectively, such that rotation of the crown gear in one direction of rotation causes the abutment 68 to engage with the catch 60 to effect corresponding pivotal motion of the castor wheel 76 movement of the crown gear in the opposite direction will cause the abutment 68 to move away from the catch 60 and in such a scenario the castor wheel moves independently of the rear wheel 78. A handed arrangement of the castor wheel 80 and crown gear 74 is found on the front right castor of the castor. FIG. 6 reveal the effect of the operator pushing the trolley from the rear thereof around a right handed turn. The effect of the operator pushing is to cause the rear wheel 78 to rotate in a counter clockwise direction which thereby effects a corresponding and equal rotation of the front wheel 76 in a clockwise direction. The same motion causes the right hand rear wheel 82 to rotate in a counter clockwise direction which effects a clockwise rotation of the crown gear of the front right wheel 74. The effect of this latter motion is to cause the front right wheel crown gear abutment 70 to move away from the catch 62 and thus the clockwise rotation of the front left wheel is a movement which is independent of the motion of the rear wheel 82. In such an arrangement, it can be clearly seen that the controlled cornering of the trolley is effected by means of the outer wheels 76 and 78 and the inner wheels 80 and 82 merely follow the direction of the outer wheels.

Figure 7:
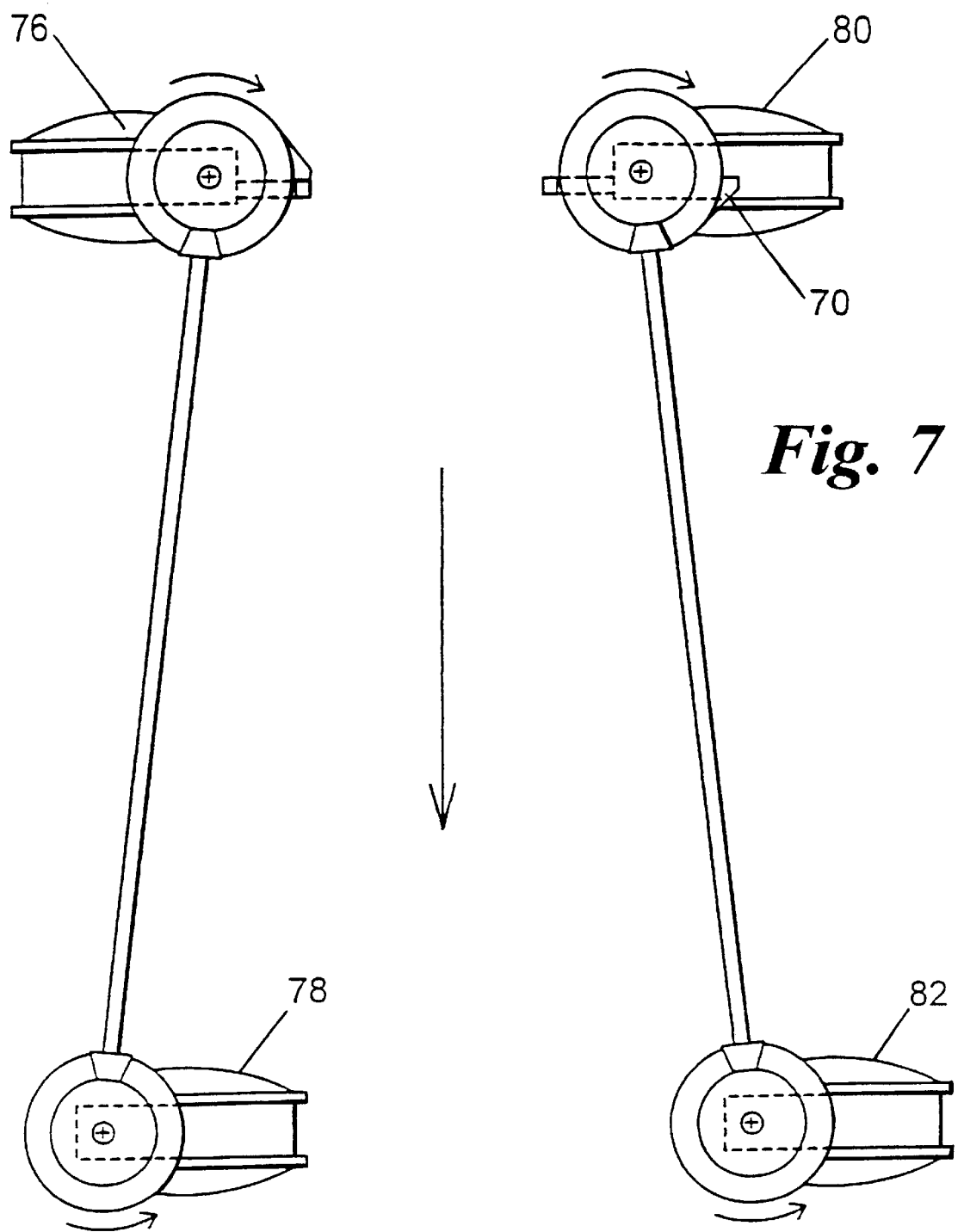
FIG. 7 is a plan view of four castors taken half-way through a reverse directional change.
Figure 8:
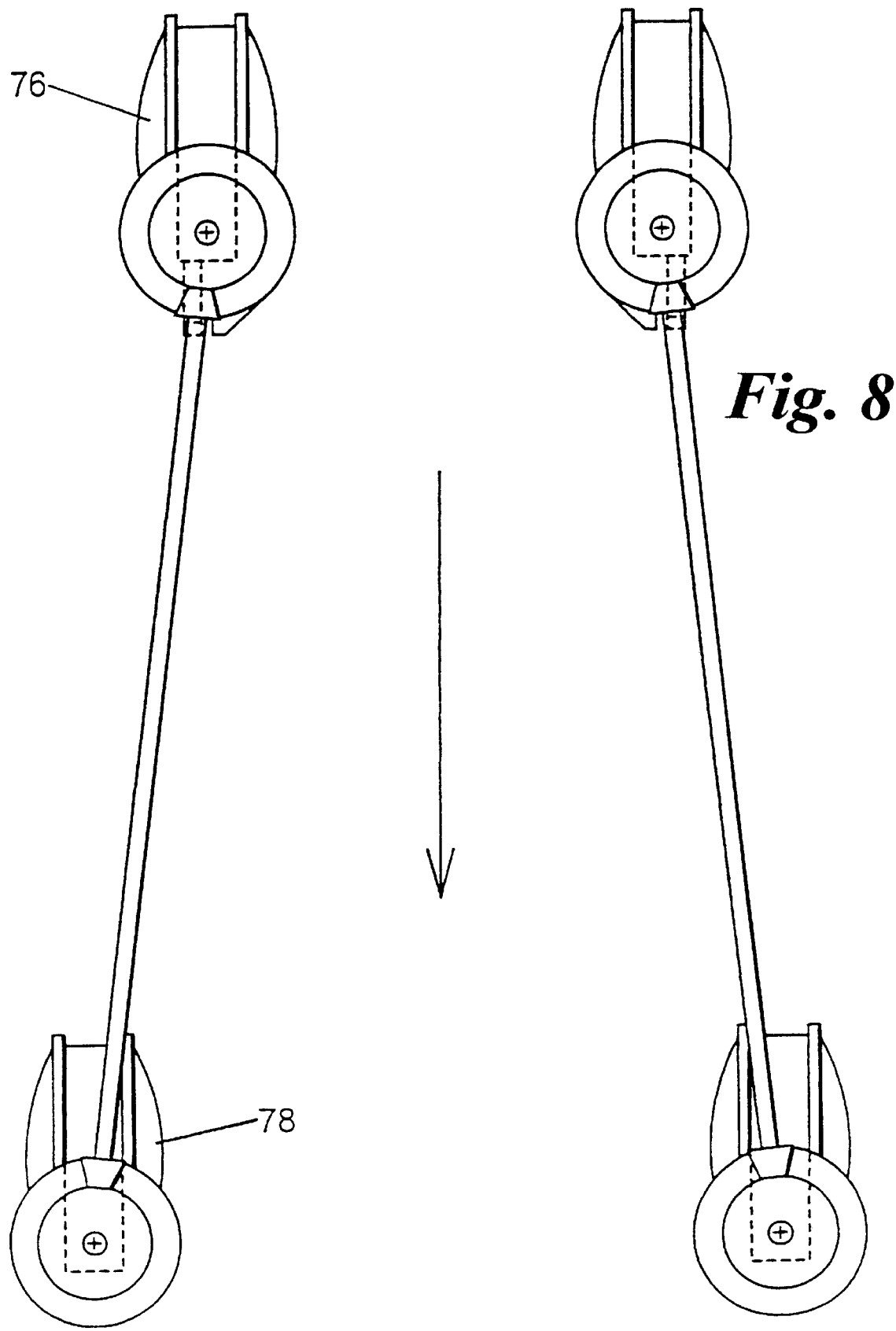
FIG. 8 is a plan view of four castors during reverse travel.
Figure 9:
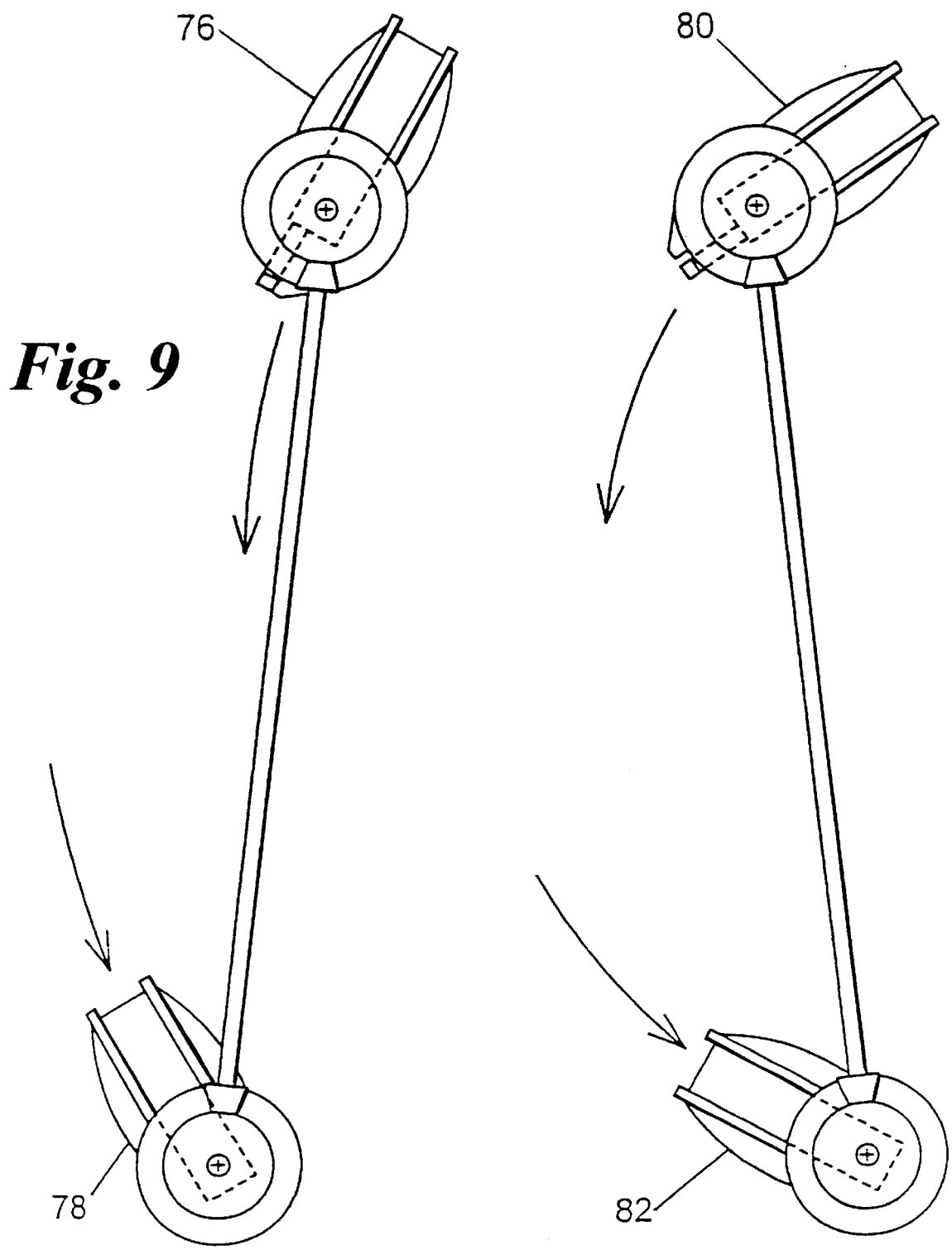
FIG. 9 is a plan view of four castors during a right-turn in a reverse direction.
Figure 10:
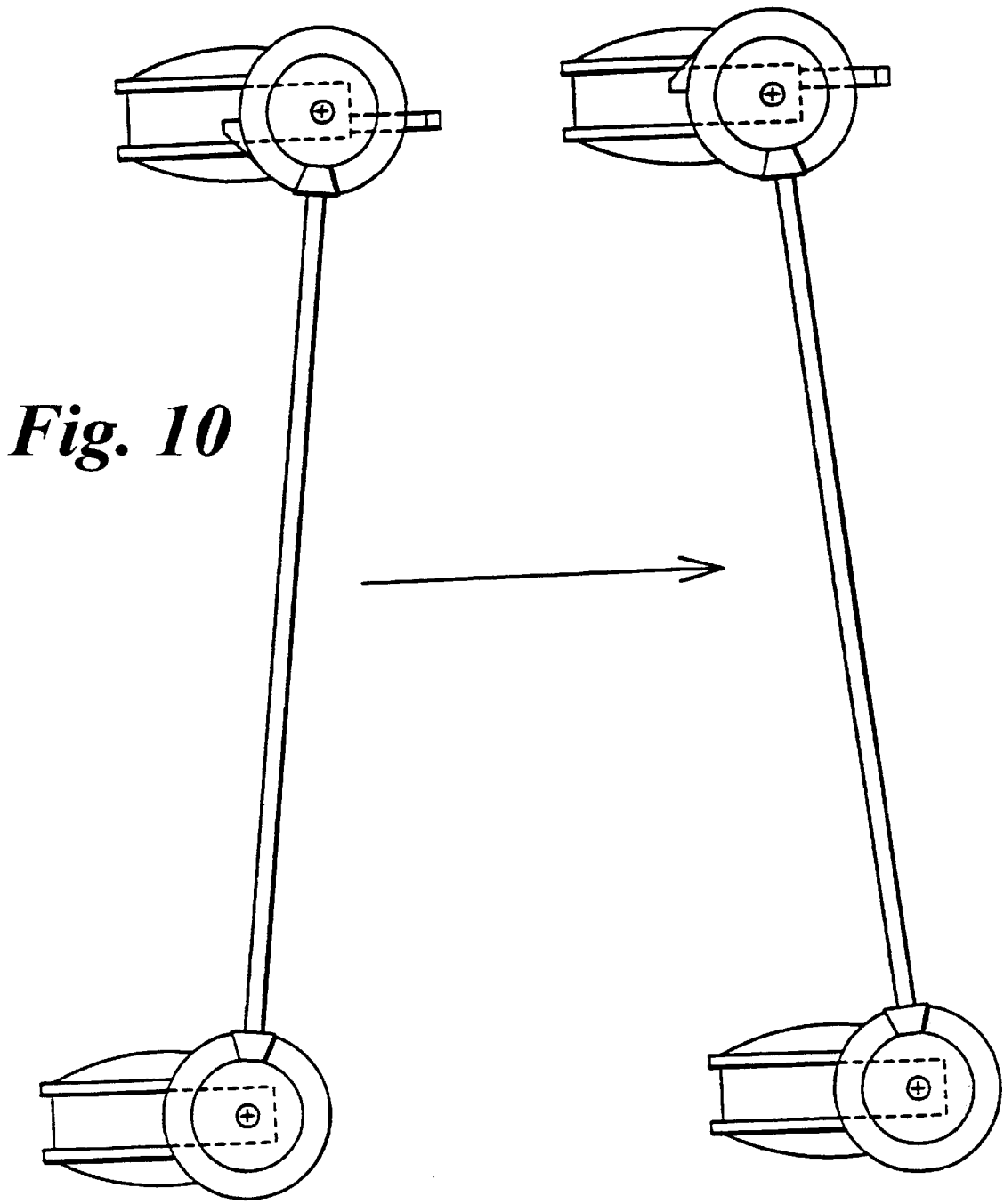
FIG. 10 is a schematic plan view of four castors during sideways movement of the trolley.

FIG. 7 shows the effect of reversing the trolley direction. The rear left wheel 78 rotates 90° counter clockwise from the position of the forward direction and this effects a corresponding clockwise rotation of the front wheel 76 the abutment 68 abutting and engaging the catch 60 to effect this motion. Alternatively, the right rear wheel 82 which is similar to the left rear wheel 78 moves 90° in a counter clockwise direction cannot effect any turning motion on the front wheel 80 as the effect of such a turn is to cause the abutment 70 to move away from the catch 62. FIG. 8 shows the completion of the motion of the wheel for reversed motion of the trolley and it can be seen that the effect of the abutment on the catch of the front left wheel has caused the wheel 76 to follow the motion of the rear wheel 78 whereas the right handed wheels have followed independent motions. When the reversal of the wheels was almost complete the right buttress 70 and catch 62 approached each other from the non engaging sides respectively, the buttress pushed out the catch which then sprang back into place once the action was completed. Finally a gap reappears between the buttress and the catch thus the wheel remains independent in the direction of rotation. The situation illustrated in FIG. 9 is where a right turn is being effected in a reverse direction and it can be seen that the outer wheels 76 and 78 are acting in coordination to give improved cornering and the inner wheel 80 and 82 follow the outer wheels as with the forward direction. FIG. 10 shows a possible sideways movement of the trolley when the operator has disengaged both front wheels to allow the lower plate of the crown gears to move independently of the upper plate which allows normal movement of the trolley in any direction which includes the sideways direction shown.

The examples given are merely provided by way of example and have included right handed, forward and reverse cornering. Left handed, forward and reverse cornering is also possible and in this scenario the right handed wheels will effect the cornering and the left handed wheels will follow.

In a further embodiment of the invention the two mechanisms for the spring loading catch can be combined. The first mechanism described being utilised for cable withdrawal by the user or during stacking of the trolley and the second mechanism being utilised for the automatic engagement of inner or outer wheel depending on cornering direction.

Figure 11A:
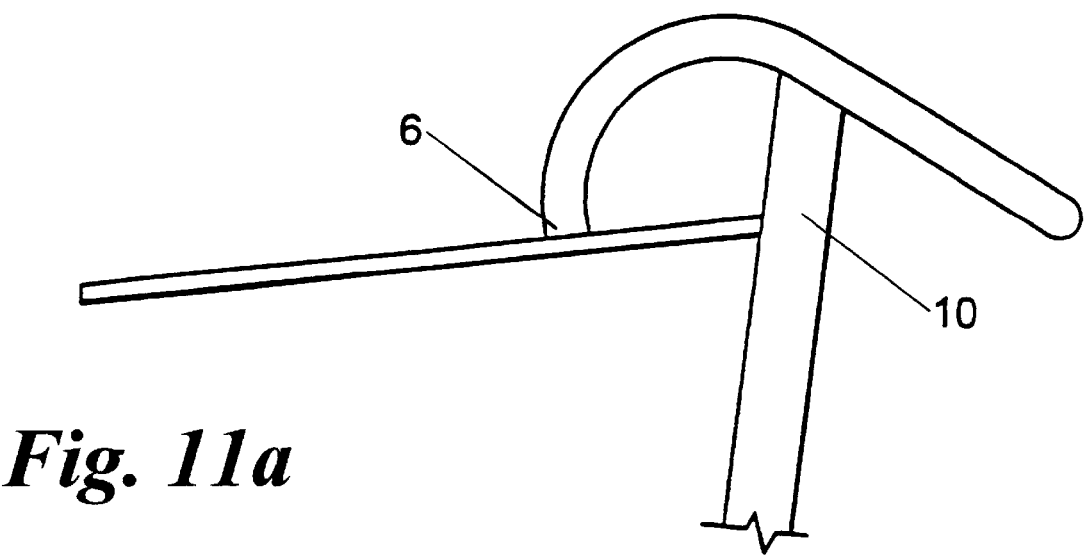
FIG. 11(*a*) is a side view of a handle bar.
Figure 11B:
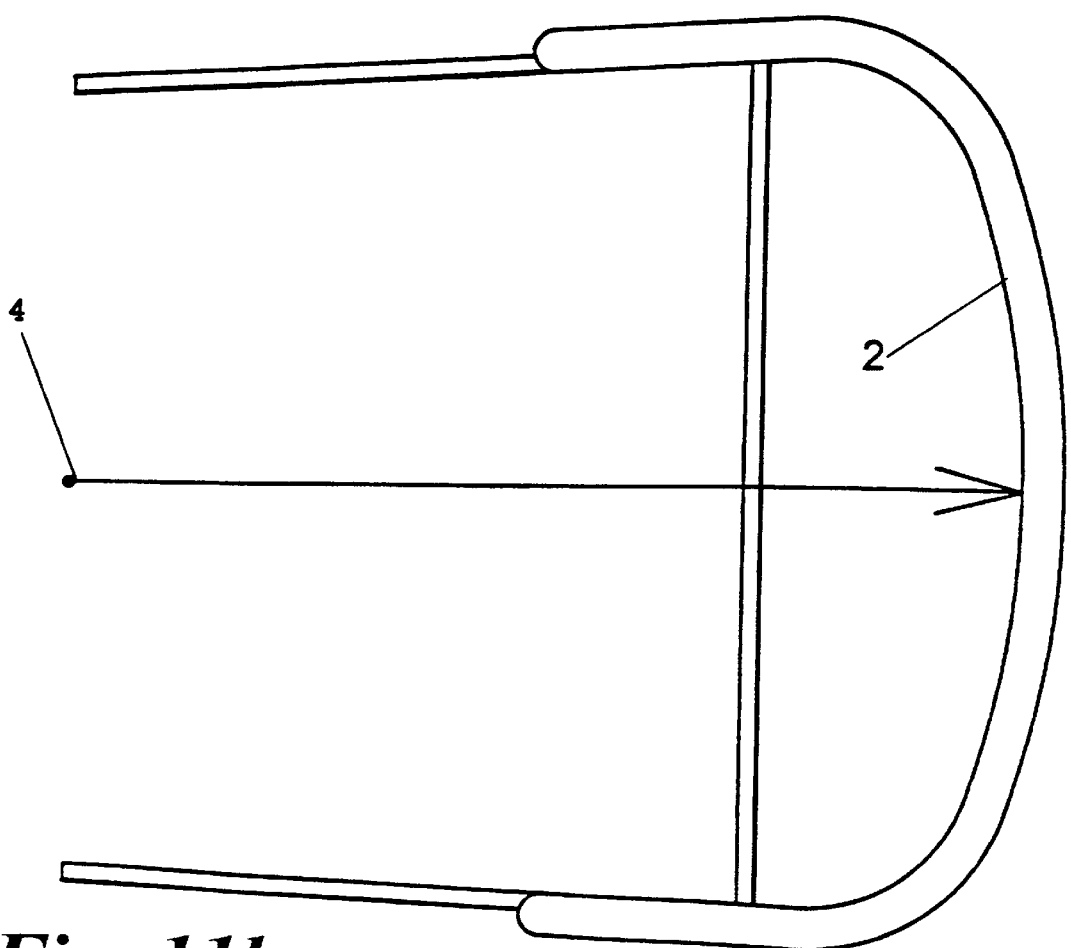

Referring to FIG. 11 (a) and (b), an arcuate handle bar 2 (suitable for use with the trolley as described with reference to FIGS. 1–10 or with other types of trolley) defines an arc having a radius described from the centre of rotation 4 of the trolley. A symmetrical handle bar 2 has two ends 6,8 which meet the side rims of the trolley basket at a point towards the rear of the basket. The ends of the bar extend upwardly in an arc parallel with the sides of the basket to be secured to the upper ends respectively of the rear trolley frame uprights 10,12 and thereafter extend downwardly at a 30° angle with respect to a horizontal plane whilst turning sharply in the vertical plane to allow a smooth transition into the main arcuate portion of the handle bar. The user actuated wheel mechanism disengagement bar will typically mimic the curvature of the handle bar so as to allow easy access therefrom.

Referring to FIG. 12, an alternative version of the communication means between the drive and driven wheels is shown. Front and rear sprockets 120,122 are fixedly axially mounted onto respective coaxial wheel spindles 124,126 for rotational movement therewith during cornering of the trolley. The drive sprocket wheel 122 communicates with the driven sprocket wheel 124 by way of a plurality of identically sized balls 128 forming an endless line through the annular cavity of a loop 130, which loop extends between the said sprockets such that the drive sprocket 122 lies adjacent to an inside edge of one side of the loop and the driven sprocket 120 lies adjacent the outside edge of the opposite side of the loop. The teeth of each sprocket are dimensioned for close fitting engagement with each of the balls and the respective wheel spindles 124, 126 are suitably spaced from respective inside and outside edges of the loop to allow such engagement. Sprocket access to the balls is provided by respective lateral slots 132, 134 formed in the part of the loop adjacent to each sprocket.

In use, the drive sprocket 122 rotates in response to corresponding movements in the drive wheel and this causes the successive teeth to engage successive balls and thus urge the line of balls through the loop. A corresponding sprocket mounted on the driven wheel is similarly positioned with respect to the balls on the opposite side of the loop and thus successive balls engage successive teeth in the driven sprocket thus causing the driven sprocket and hence the driven wheel to be rotated by the balls in response to rotation of the drive sprocket. By placing the drive sprocket on the inside of the loop and the driven sprocket on the outside of the loop, rotation of the drive sprocket in a clockwise direction results in a counterclockwise rotation of the driven sprocket and vice-versa.

Referring to FIGS. 13 (a)–(c), a further catch device combines the features of the previous catches into a single embodiment and also provides means to lock both inner and outer steering mechanisms during cornering of the vehicle to prevent 'run-away' of the trolley.

The methods of use and particular arrangement with respect to the driven wheel 135 of the catch 136 are similar to those previously described in relation to driven wheel 2a and catch 36. However, catch 136 includes a sloped face 138 and a corresponding sloped face 141 on one side of the socket 140 so that rotation of the upper plate 132, when only the part of the catch with the sloped surface protrudes into the socket 140, is permitted in only one direction. The operation of the mechanism is as follows. In the position of the catch 136 shown in FIG. 13(a), the sloped surface 138 of the catch 136 faces the corresponding sloped surface 141 of the socket 140 so that rotation of the upper plate 132 with respect to the lower plate 134 may cause the sloped face 141 to be urged against the sloped face 138 of the catch 136 to cause the spring loaded catch to depress to allow relative rotation of the upper and lower plates to continue. Alternatively, relative rotation in the opposing direction of the upper and lower plate causes the upper plate to urge against vertical face 139 of the catch 136 and thereafter continued rotation causes a corresponding rotation of the lower plate 134 and its respective wheel (not shown).

Figure 13A:
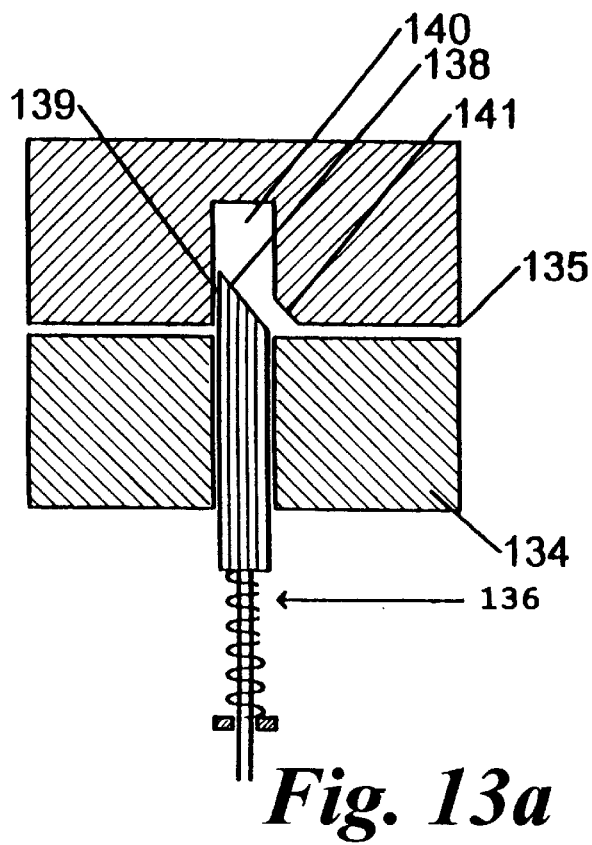
FIG. 13 (*a*)–(*c*) shows possible means to effect the wheel locking mechanism.

Thus the catch arrangement shown in FIG. 13(a) allows independent rotation of a driven wheel in one direction and incorporates a driving mechanism in the opposite direction. Such an arrangement is therefore suitable for use with driven wheels of the invention, the respective slope arrangements of two driven wheels at the front of a trolley being opposite handed.

Figure 13B:
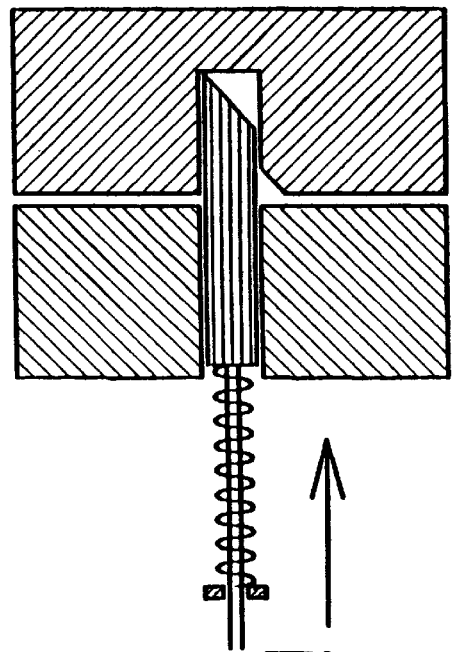
Figure 13C:
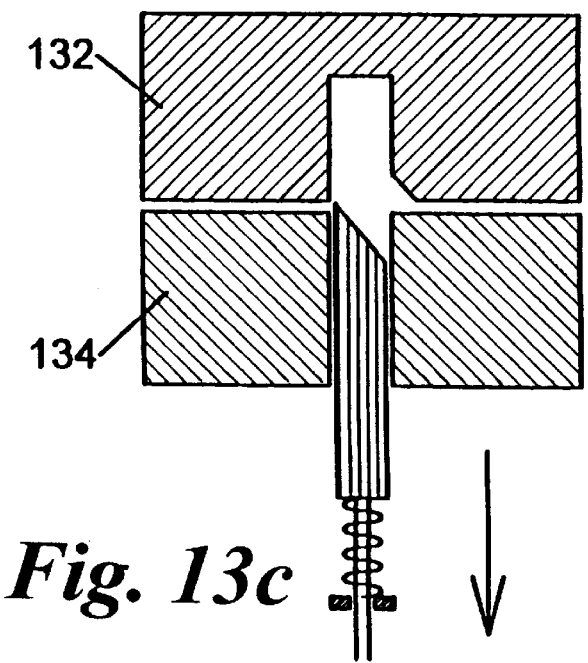

FIG. 13c shows the catch fully retracted to allow free movement of the driven wheel irrespective of the direction of relative rotation of the upper and lower plates 132, 134. The disengagement of the steering mechanism by retracting the catch 136 may be effected in the manner previously described with respect to catch 36 and disengaging handle 56. The catch 136 thus provides the overall disengaging mechanism and inner/outer wheel steering mechanism in a single unit and avoids the necessity of providing separate mechanisms for these features.

The catch 136 also provides a wheel locking feature if the catch is fully advanced into the socket 140. The arrangement is shown in FIG. 13(b) where it can be seen that the vertical walls of the socket are sufficiently deep to fully contain the sloped part of the catch 136 so that the vertical sides of the catch mutually engage with the vertical sides of the socket disposed above the upper edge of the sloped face 141. In this position of the catch, rotation of the upper plate 132 in any direction causes a corresponding rotation of the lower plate 134 and hence the driven wheels. The fully advanced position of the catch 136 can be effected by an arrangement similar to that used for full disengagement of the upper and lower plates as previously described. The locked position of the plates as shown in FIG. 13(b) may be utilised to overcome the problems encountered on sloped surfaces, as described above, to reduce the tendency of the trolley to run downhill if only the outer wheels are controlling cornering of the trolley.

I claim:

1. A steerable trolley comprising:
   at least four wheels each pivotable about a respective substantially vertical axis;
   a steering mechanism comprising communication means between a driving wheel and a corresponding driven wheel, the communication means being operable such that pivotal movement of the said driving wheel about a substantially vertical axis acts to produce a pivotal movement of the said corresponding driven wheel, such that when the driving wheel is a rear wheel of the said at least four wheels, the driven wheel is a front wheel of the said at least four wheels and vice versa;
   means for automatically engaging the outside driven wheel and disengaging the inside driven wheel during cornering of the trolley, so that
   only the outside driving wheel acts to produce the said pivotal movement of its corresponding driven wheel respectively during cornering of the trolley.

2. A trolley according to claim 1 wherein the means for engaging or disengaging the driven wheel is provided by a lug, connected to a rack, which engages with an abutment connected to the wheel in one direction of rotation of the rack and disengages in the other direction of the rotation of the rack.

3. A trolley according to claim 1 wherein the means for engaging or disengaging the driven wheel is provided by a spring loaded catch.

4. A trolley as claimed in claim 1, wherein means are provided for disengaging the steering mechanism to allow independent pivotal movement of the said wheels.

5. A trolley as claimed in claim 4, wherein the disengagement is effected by disengaging either of said wheels from their corresponding racks.

6. A trolley as claimed in claim 1, wherein means are provided for locking the steering mechanism to prevent the disengagement which normally occurs at the inner wheels during cornering of the trolley.

7. A trolley according to claim 1, wherein there are at least four pivotable wheels and two communication means between a first and second set of front and rear wheels.

8. A steerable trolley according to claim 1
   wherein the communication means comprises a plurality of parts forming or formed into an endless line within the cavity of a close fitting loop, which loop extends between respective sprockets on the drive and driven wheels located at either end of the loop to transfer rotative movement from the drive wheel to the driven wheel by engagement of the teeth of the drive and driven sprockets with the parts during rotation of the drive wheel; and
   wherein sprocket access to the parts is provided by respective lateral slots formed in the part of the loop adjacent to each sprocket.

9. A steerable trolley as claimed in claim 8, wherein the parts are balls and each ball between respective sprockets abuts onto the next to effect movement of the line during driven wheel rotation.

10. A trolley according to claim 1 wherein the said communication means comprises a substantially horizontal longitudinal bar extending between the front and rear wheel which translates pivotal movement of the rear wheel into pivotal movement of the front wheel and vice versa.

11. A trolley according to claim 10, wherein the longitudinal bar is so associated with the rear wheel and front wheel as to respond to pivotal movement of the rear wheel by rotating about its own longitudinal axis which simultaneously effects pivotal movement of the front wheel and vice versa.

12. A trolley according to claim 10, wherein the longitudinal bar has co-axial pinions disposed at either end thereof which engage with respective racks on each of the associated front and rear wheels which racks rotate, to effect rotation of the associated pinion, in response to the pivotal movement of the front or rear wheel.

13. A trolley according to claim 1, wherein the said pivotable movement of the said driving wheel is caused by a lateral movement of the trolley at the end of the trolley where the said driving wheel is located.

14. A trolley according to claim 1, wherein the movement of the trolley is effected by the manual application of steering-effort.

15. A trolley according to claim 1, wherein the outside rear wheel acts to produce the said pivotal movement of the outside front wheel during cornering of the trolley.

16. A trolley according to claim 1, wherein the said wheels are capable of complete reversals of direction by independently completing 180° pivots.

17. A trolley according to claim 1, wherein said pivotal movement is an equal and opposite pivotal movement of the corresponding wheel.

18. A trolley according to claim 1 including a handle bar which defines an arc whose centre equates with the centre of rotation of the trolley.

19. A trolley according to claim 18, wherein the handle bar is angled downwardly towards the rear of the trolley.

20. A trolley according to claim 1, wherein a side bar is provided to allow manoeuvring of the trolley from the side.

21. A trolley according to claim 19, wherein two side bars and the arcuate handle bar are incorporated into a single symmetrical bar.

22. A trolley according to claim 1 wherein there is a differential between the offset of the drive and driven wheels.

23. A trolley according to claim 1, wherein the trolley is a shopping trolley.

* * * * *